(12) United States Patent
Athalye

(10) Patent No.: US 10,531,535 B2
(45) Date of Patent: Jan. 7, 2020

(54) SOLID STATE LIGHTING APPARATUS WITH ELECTRICAL CONNECTORS INCLUDING PORTIONS OF DRIVER CIRCUITS

(71) Applicant: IDEAL Industries Lighting LLC, Durham, NC (US)

(72) Inventor: Praneet Jayant Athalye, Morrisville, NC (US)

(73) Assignee: IDEAL Industries Lighting LLC, Durham, NC (US)

(*) Notice: Subject to any disclaimer, the term of this patent is extended or adjusted under 35 U.S.C. 154(b) by 0 days.

(21) Appl. No.: 15/660,168

(22) Filed: Jul. 26, 2017

(65) Prior Publication Data

US 2017/0325311 A1 Nov. 9, 2017

Related U.S. Application Data

(63) Continuation of application No. 14/279,822, filed on May 16, 2014, now Pat. No. 9,750,106, which is a
(Continued)

(51) Int. Cl.
*H05B 33/08* (2006.01)
*F21K 9/23* (2016.01)
(Continued)

(52) U.S. Cl.
CPC ........... *H05B 33/0884* (2013.01); *F21K 9/23* (2016.08); *F21K 9/238* (2016.08); *F21V 17/002* (2013.01);
(Continued)

(58) Field of Classification Search
CPC ....... H05B 33/0884; F21K 9/238; F21K 9/23; H01R 13/6658; H01R 33/22; F21V 17/002
See application file for complete search history.

(56) References Cited

U.S. PATENT DOCUMENTS 4,150,250 A 4/1979 Lundeberg
5,065,299 A 11/1991 Cohen
(Continued)

FOREIGN PATENT DOCUMENTS

GB 2 410 044 A 7/2005
RU 2059 891 5/1996
RU 2246049 2/2005

OTHER PUBLICATIONS

International Preliminary Report on Patentability Corresponding to International Application No. PCT/US2013/038850: dated Nov. 18, 2014; 12 Pages.
(Continued)

*Primary Examiner* — Evan P Dzierzynski
(74) *Attorney, Agent, or Firm* — Myers Bigel, P.A.

(57) ABSTRACT

A solid state lighting apparatus can include an electrical connector that is configured to releasably couple to a standardized electrical fixture having ac voltage provided thereat, where the electrical connector includes an opening that is configured to provide a recess in the electrical connector including an interior contact to provide the ac voltage in the recess when connected to the standardized electrical fixture. A protective circuit stage of a solid state lighting driver circuit can be in the recess to electrically coupled to the interior contact. An electrical wire can include a first portion that can be electrically coupled to the protective circuit stage in the recess and a second portion that is outside the recess. A solid state lighting housing can be configured to releasably couple to the second portion of the electrical wire.

6 Claims, 7 Drawing Sheets

Related U.S. Application Data continuation of application No. 13/461,384, filed on May 1, 2012, now Pat. No. 8,757,863.

(51) Int. Cl.
| | | |
|---|---|---|
| *F21K 9/238* | (2016.01) | |
| *H01R 13/66* | (2006.01) | |
| *H01R 33/22* | (2006.01) | |
| *F21V 17/00* | (2006.01) | |
| *F21V 23/00* | (2015.01) | |
| *F21V 23/06* | (2006.01) | |
| *F21Y 115/10* | (2016.01) | |

(52) U.S. Cl.
CPC ............ *F21V 23/006* (2013.01); *F21V 23/06* (2013.01); *H01R 13/6658* (2013.01); *H01R 33/22* (2013.01); *F21Y 2115/10* (2016.08)

(56) References Cited

U.S. PATENT DOCUMENTS

| | | | |
|---|---|---|---|
| 5,806,965 A * | 9/1998 | Deese | B64F 1/20 |
| | | | 362/237 |
| 5,980,072 A | 11/1999 | Zirkle | |
| 5,982,110 A | 11/1999 | Gradzki | |
| 6,095,671 A | 8/2000 | Hutain | |
| 7,213,940 B1 | 5/2007 | Van de Ven | |
| 8,742,671 B2 | 6/2014 | Van de Ven et al. | |
| 2004/0066142 A1 | 4/2004 | Stimac et al. | |
| 2004/0071557 A1 | 4/2004 | Khomynets | |
| 2004/0212993 A1 | 10/2004 | Morgan et al. | |
| 2005/0128751 A1 | 6/2005 | Roberge et al. | |
| 2005/0265035 A1 * | 12/2005 | Brass | F21L 4/00 |
| | | | 362/451 |
| 2006/0094285 A1 | 5/2006 | Newell | |
| 2006/0146527 A1 | 7/2006 | VanderSchuit | |
| 2006/0232974 A1 | 10/2006 | Lee et al. | |
| 2008/0232116 A1 | 9/2008 | Kim | |
| 2008/0265801 A1 * | 10/2008 | Lee | H05B 33/0803 |
| | | | 315/297 |
| 2009/0016900 A1 | 1/2009 | Khomynets | |
| 2009/0161352 A1 | 6/2009 | Mackin et al. | |
| 2009/0316396 A1 * | 12/2009 | Tsai | F21K 9/00 |
| | | | 362/235 |
| 2010/0165632 A1 | 7/2010 | Liang | |
| 2010/0220468 A1 | 9/2010 | Pearson | |
| 2010/0238644 A1 | 9/2010 | Huang et al. | |
| 2010/0301779 A1 | 12/2010 | Spartano et al. | |
| 2011/0019438 A1 | 1/2011 | Juang et al. | |
| 2011/0080740 A1 | 4/2011 | Allen et al. | |
| 2011/0080742 A1 | 4/2011 | Allen et al. | |
| 2011/0096562 A1 | 4/2011 | Lambert | |
| 2011/0193491 A1 | 8/2011 | Choutov et al. | |
| 2011/0211351 A1 | 9/2011 | Van de Ven et al. | |
| 2012/0224395 A1 | 9/2012 | Cao | |

OTHER PUBLICATIONS

Van deVen, et al.; *Solid State Lighting Apparatus and Methods Using Integrated Driver Circuitry*, U.S. Appl. No. 13/192,755, filed Jul. 28, 2011, (19 Pages).

Notification of Transmittal of the International Search Report and the Written Opinion of the International Searching Authority, or the Declaration, PCT/US2013/038850, dated Aug. 27, 2013, 14 pages.

* cited by examiner

SOLID STATE LIGHTING APPARATUS WITH ELECTRICAL CONNECTORS INCLUDING PORTIONS OF DRIVER CIRCUITS

CROSS-REFERENCE TO RELATED PATENT APPLICATIONS

The present application is a continuation of U.S. patent application Ser. No. 14/279,822, filed May 19, 2014 entitled SOLID STATE LIGHTING APPARATUS WITH ELECTRICAL CONNECTORS INCLUDING PORTIONS OF DRIVER CIRCUITS, which is a continuation of U.S. patent application Ser. No. 13/461,384, filed May 1, 2012 (now U.S. Pat. No. 8,757,863, issued Jun. 24, 2014) entitled SOLID STATE LIGHTING APPARATUS WITH ELECTRICAL CONNECTORS INCLUDING PORTIONS OF DRIVER CIRCUITS, the disclosures of which are hereby incorporated by reference in their entirety.

BACKGROUND

Because a large portion of electricity in the United States is used for lighting, there are ongoing efforts to provide lighting that is more energy efficient. Solid state light emitting devices (e.g., light emitting diodes) are receiving attention because light can be generated more efficiently than using conventional incandescent or fluorescent light bulbs. Moreover, lifetimes of solid state light emitting devices may be significantly longer those of incandescent or fluorescent light bulbs.

Conventional light bulbs generally operate using 120 volt ac electrical power provided through an Edison fixture configured to receive an Edison screw fitting on conventional light bulbs, whereas solid state lighting devices may utilize dc power.

SUMMARY

Embodiments according to the invention can provide a solid state lighting apparatus that can include an electrical connector that is configured to releasably couple to a standardized electrical fixture having ac voltage provided thereat, where the electrical connector includes an opening that is configured to provide a recess in the electrical connector including an interior contact to provide the ac voltage in the recess when connected to the standardized electrical fixture. A protective circuit stage of a solid state lighting driver circuit can be in the recess to electrically coupled to the interior contact. An electrical wire can include a first portion that can be electrically coupled to the protective circuit stage in the recess and a second portion that is outside the recess. A solid state lighting housing can be configured to releasably couple to the second portion of the electrical wire.

DETAILED DESCRIPTION OF EMBODIMENTS ACCORDING TO THE INVENTION

Figure 1A:
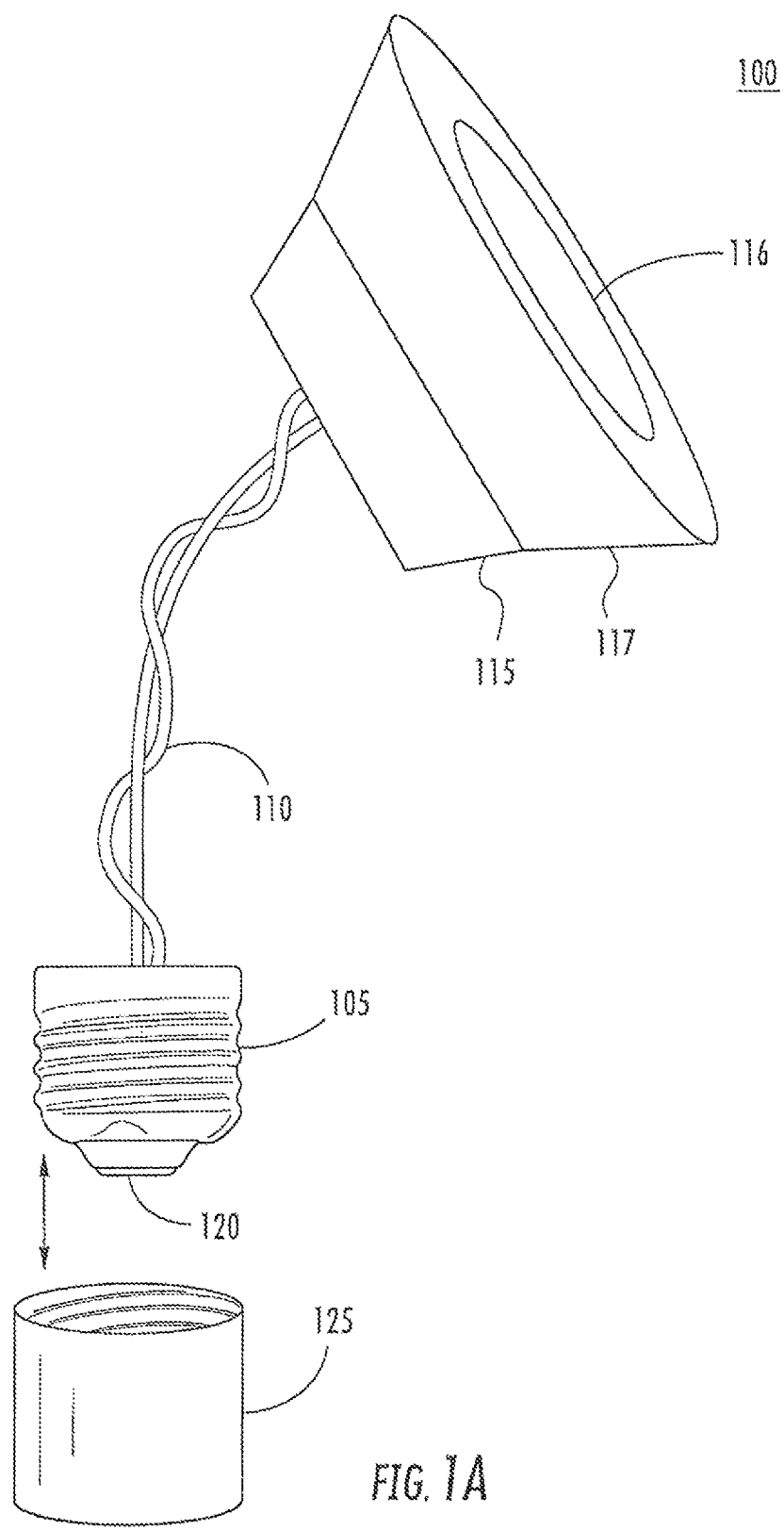
FIGS. 1A and 1B are illustrations of a solid state lighting apparatus including an electrical connector including at least a portion of a solid state driver circuit in some embodiments according to the invention.

Embodiments of the present inventive subject matter now will be described more fully hereinafter with reference to the accompanying drawings, in which embodiments of the present inventive subject matter are shown. This present inventive subject matter may, however, be embodied in many different forms and should not be construed as limited to the embodiments set forth herein. Rather, these embodiments are provided so that this disclosure will be thorough and complete, and will fully convey the scope of the present inventive subject matter to those skilled in the art. Like numbers refer to like elements throughout.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing ac incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device.

The present inventive subject matter further relates to an illuminated enclosure (the volume of which can be illuminated uniformly or non-uniformly), comprising an enclosed space and at least one lighting apparatus according to the present inventive subject matter, wherein the lighting apparatus illuminates at least a portion of the enclosed space (uniformly or non-uniformly).

As described herein in greater detail, in some embodiments according to the invention, at least a protective circuit stage of a solid state driver circuit can be provided separate from other stages of the solid state lighting driver circuit. The protective circuit stage can be located, for example, within a recess in an electrical connector that may be releasably coupled to a standardized electrical fixture (such as what is commonly referred to as an Edison base). Moreover, the remaining stages of the solid state lighting driver circuit (such as an EMI filter and rectifier circuit stage and a boost circuit stage) can be located separately within another portion (such as a housing of the solid state lighting apparatus), which can also be releasably coupled to the portion that includes the protective circuit stage. In other embodiments according to the invention, the EMI filter and rectifier circuit stage can be included with the protective circuit stage within the recess. In still other embodiments according to the invention, the boost circuit stage can also be included with the protective circuit stage and the EMI filter and rectifier circuit stage, so that all stages of the solid state driver circuit may be included with the recess of the electrical connector.

As used herein, the term "remaining stages" includes stages other than the protective circuit stage. For example, when only the protective circuit stage is included in the recess, the remaining stages includes the EMI filter and protective stage and the boost circuit stage. When, however, the EMI filter and rectifier stage and the protective circuit stage are co-located in the recess, the remaining stage includes only the boost circuit stage.

Locating at least the protective circuit stage within the recess (separate from the other stages of the solid state lighting driver circuit) can allow the other stages to be laid out in accordance with a Regulatory Agency standard for which compliance is sought. For example, the components included in the protective circuit stage may be laid out on a separate circuit board located in the recess, whereas the components of the remaining stages may be laid out on a separate circuit board without allowing for the additional spacing which would be otherwise called for if protective circuit stage components (or the EMI filter and rectifier circuit stage components) were included on the same circuit board. Accordingly, the respective circuit board may be sized appropriately, which may in turn reduce the size of the housing in which the solid state lighting apparatus is located.

In still other embodiments according to the invention, the remaining stages of the solid state lighting driver circuit and the LED array can be integrated onto a single printed circuit board. For example, in some embodiments according to the invention, the LED array, which provides the light output from the solid state lighting apparatus, can be mounted on the circuit board with the EMI filter and rectifier circuit stage and the boost circuit stage, so that a housing of the apparatus can be smaller. Accordingly, the integrated LED array/solid state lighting driver circuit board can be located directly behind a diffuser of the solid state lighting apparatus through which light is emitted.

In still further embodiments according to the invention, because portions of the solid state lighting apparatus can be releasably coupled to one another, a field replaceable unit including a replacement electrical connector (including at least the protective circuit stage) can be provided as part of a kit, such that if the original protective circuit stage fails, the failed circuit can be decoupled from the other portion of the apparatus and a replacement electrical connector with a replacement protective circuit stage located therein can be coupled to the other portion so that the solid state lighting apparatus may be repaired in the field, thereby avoiding the necessity of returning the solid state lighting apparatus to a repair depot. In some embodiments according to the invention, the replacement electrical connector with a replacement circuit may be available separately.

In still further embodiments according to the invention, the field replaceable unit may also include a replacement electrical wire which may replace the electrical wire originally included with the solid state lighting apparatus. In other embodiments according to the invention, the original electrical wire provided with the solid state lighting apparatus may be reused by decoupling the failed portion from the original electrical wire (which remains electrically coupled to the solid state lighting apparatus) whereupon the field replaceable electrical connector is coupled to the original electrical wire thereby completing the repair of the solid state lighting apparatus.

FIG. 1A is a schematic illustration of a solid state lighting apparatus 100 in some embodiments according to the invention. According to FIG. 1A, a standardized electrical fixture 125 can be provided with an ac voltage signal, typically found in a commercial or residential electrical installation. For example, in some embodiments according to the invention, the ac voltage signal is 110 volts ac or 220 volts ac. Other voltage levels may be used.

The standardized electrical fixture 125 can be a fixture designated as an E26 Edison style fixture (sometimes referred to using the IEC Standard Sheet Designation 7004-21A-2) which allows a corresponding portion of the solid state lighting apparatus 100 to be releasably coupled to the standardized electrical fixture 125, by screwing the apparatus 100 into (or out of) the standardized electrical fixture 125. It will be understood that the standardized electrical fixture 125 may be any standardized electrical fixture that complies with any standardized electrical specification available throughout the world, which allows the solid state lighting apparatus 100 to be releasably coupled thereto. For example, in some embodiments according to the invention, the standardized electrical fixture 125 can be an E5, E10, E11, E14, E17, E27, E29, E39, E40, or the like. In other embodiments according to the invention, the standardized electrical fixture 125 can be a so called "bayonet style" such as a B15d, BA15d, BA15s, BA20d, B21s-4, B22d, B24s-3, GU10, GZ10, G24, or the like. It will further be understood that the term "releasably coupled" includes any type of action that allows the apparatus 100 to be coupled to (and decoupled from) the fixture 125, by an end user or installation personnel, without the need for specialized tools and/or procedures in keeping the accepted practices. For example, it will be understood that the term "releasably coupled" includes actions (including the opposing actions) such as sliding, latching, screwing, twisting, pushing, and clamping.

Figure 6:
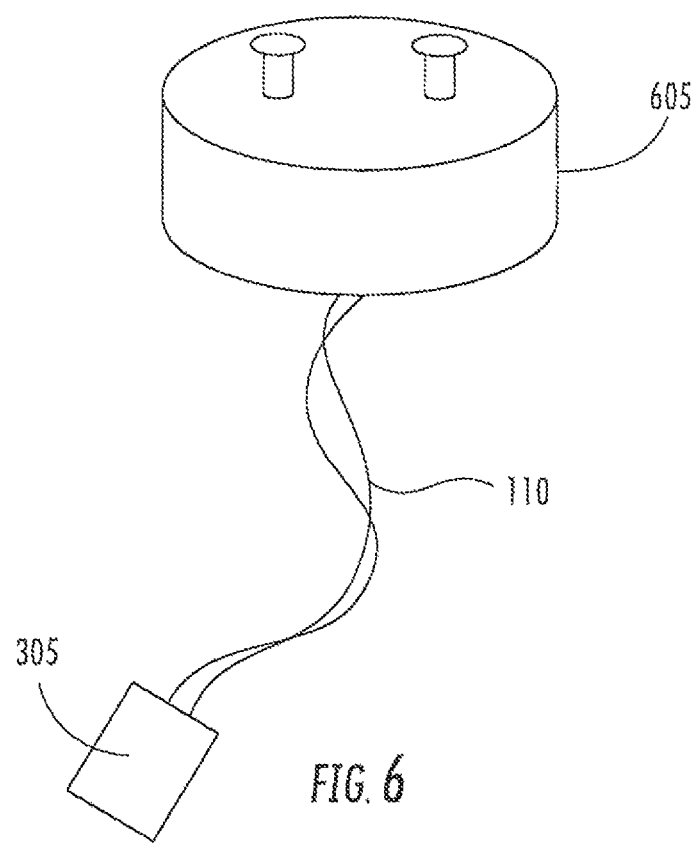
FIG. 6 is an illustration of a bayonet style electrical connector coupled to an electrical wire in some embodiments according to the invention.

According to FIG. 1A the standardized electrical fixture 125 is configured to allow an electrical connector 105 to releasably couple to the standardized electrical fixture 125. For example, in some embodiments according to the invention, the electrical connector 105 is releasably coupled to the standardized electrical fixture 125 by screwing the electrical connector 105 into the standardized electrical fixture 125. In still other embodiments according to the invention, the electrical connector can be configured to be inserted directly into the standardized electrical fixture 125 by other actions. For example, the electrical connector 105 can be a bayonet style electrical connector as shown for example in FIG. 6.

Figure 1B:
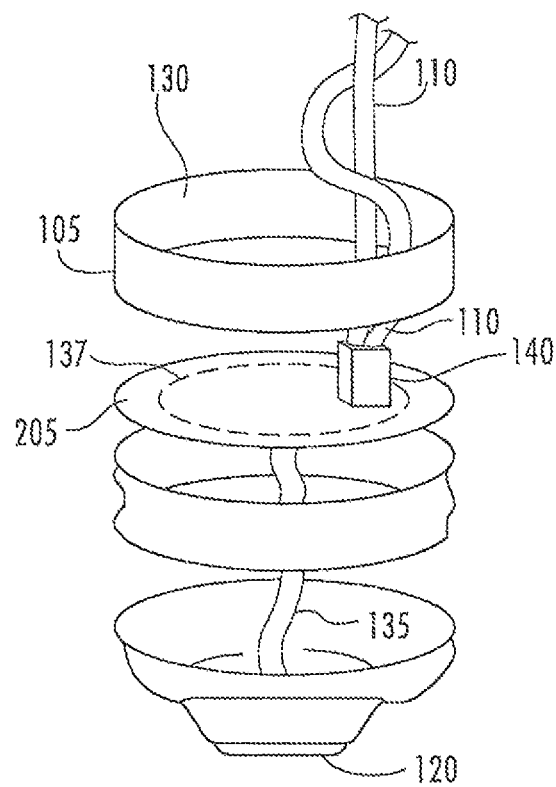

When coupled to the standardized electrical fixture 125, the electrical connector 105 is in contact with the ac voltage via a contact 120 shown at the base of the electrical connector 105. The ac voltage is, in turn, provided to an electrical wire 135 in the recess 130 within the electrical connector 105 as shown in FIG. 1B. As further shown in FIG. 1B, the ac voltage is provided to a circuit 137 (mounted on a circuit board 205) within the recess 130 using the electrical wire 135. It will be understood that the interior surface of the recess 130 can be provided at a neutral voltage level by an electrical wire coupled to the side of the recess 130.

It will be understood that, in some embodiments, the circuit 137 can include at least a protective circuit stage of a solid state driver circuit, whereas the remaining stages of the solid state driver circuit are located elsewhere in the apparatus. In other embodiments according to the invention, the circuit 137 can include the protective circuit stage and an EMI filter and rectifier circuit stage of the solid state driver circuit, whereas the boost circuit stage is located outside the recess. In still other embodiments according to the invention, the circuit 137 can include the protective circuit stage, the EMI filter and rectifier circuit stage, and a boost circuit stage (i.e., all stages) of the solid state driver circuit.

In embodiments according to the invention where the circuit 137 includes the protective circuit stage, the circuit 137 provides an ac voltage to an electrical connector 140 located on the circuit board 205. The electrical connector 140 is coupled to an electrical wire 110 that extends from the circuit board 205 to outside the recess 130.

In some embodiments according to the invention where the circuit 137 includes the protective circuit stage and the EMI filter and rectifier stage, the circuit 137 provides a dc voltage to an electrical connector 140 located on the circuit board 205. The electrical connector 140 is coupled to an electrical wire 110 that extends from the circuit board 205 to outside the recess 130. In some embodiments according to the invention, the electrical wire 110 is a 24 gauge electrical conductor or greater. In other embodiments according to the invention, the electrical wire 110 is an 18 gauge wire depending on what stages of the driver circuit are located within the recess 130.

It will be understood that, in some embodiments, the electrical connector 140 shown in FIG. 1B is configured to be releasably coupled to the circuit board 205 within the recess 130, such that if the circuit 137 were to fail, the electrical wire 110 can be decoupled from the circuit board 205 so that a replacement electrical connector (including a new protective circuit stage, for example) may be re-coupled to the electrical wire 110 so that the solid state lighting apparatus 100 may be repaired in the field without being returned to a repair depot.

As further shown in FIG. 1A, a remote end of the electrical wire 110 is electrically coupled to a solid state lighting housing 115 within which the remaining stages of the solid state lighting driver circuit can be included. The remaining stages of solid state lighting driver circuit can be coupled to an LED array within the housing 115 to provide light from the solid state lighting apparatus 100 during operation. The LED array can provide light through a diffuser 116 that is located downstream from the LED array. It will be understood, therefore, if the circuit 137 were to fail, the electrical wire 110 and the remainder of the apparatus 100 (including the LED array, the other stages of the driver circuit, the housing 115, and the diffuser 116) may be retained whereas the failed electrical connector 105 can by replaced.

Figure 1C:
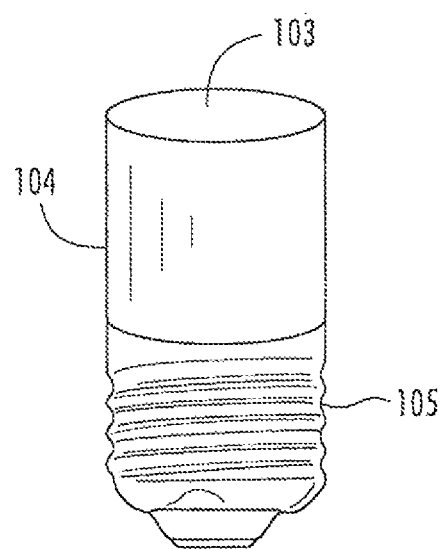
FIG. 1C is an illustration of the electrical connector having an extension thereon in some embodiments according to the invention.

FIG. 1C is an illustration of the electrical connector 105 having an extension 104 thereon so that larger sized circuits may be included within the respective portion of the apparatus to with the remaining portion may be releasably coupled. Accordingly, the recess 130 is defined to include the interior of the extension 104. For example, in embodiments where the circuit 137 is described to be in the recess 130 on the circuit board 205, the circuit board 205 and the circuit 137 can extend from inside the electrical connector 105 into at least a portion of the interior of the extension 104. In some embodiments according to the invention, the recess 130 is closed by a cover 103 through which the electrical wire 110 passes.

Figure 2:
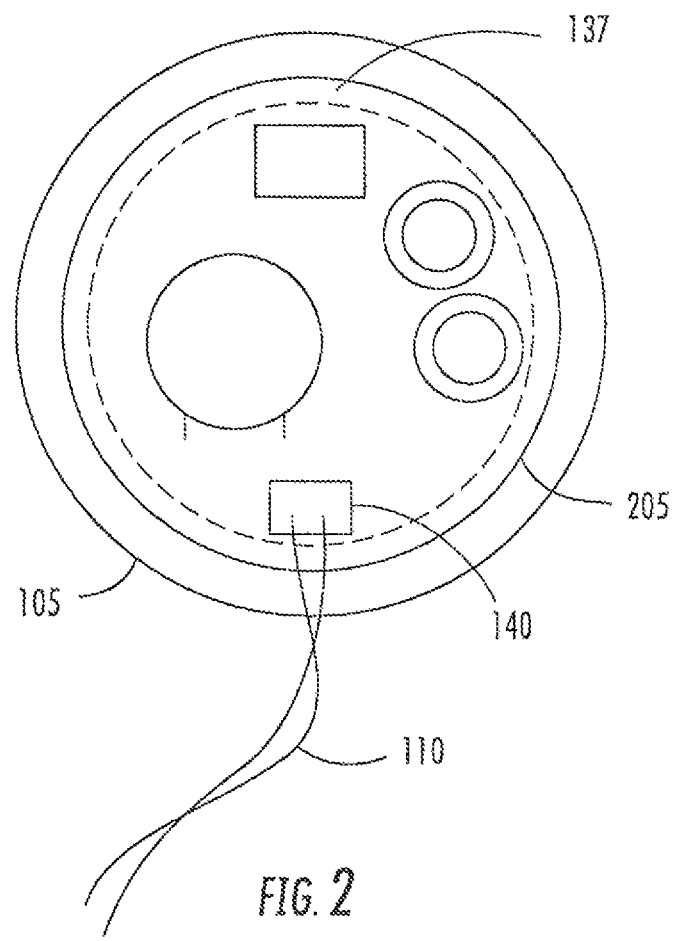
FIG. 2 is an illustration of the circuit of FIG. 1 mounted on a circuit board located in a recess of the electrical connector in some embodiments according to the invention.

FIG. 2 is a schematic illustration of the electrical connector 105 (having portions cutaway for clarity) with the circuit board 205 located within the recess 130 in some embodiments according to the invention. According to FIG. 2, the circuit 137 is located within the recess 130 on the circuit board 205. It will be understood that the electrical components included in the circuit 137 are mounted on the circuit board 205, which is laid out in compliance with a particular specification of a Regulatory Agency.

It will be further understood that the circuit board 205 can be positioned within the recess 130 so that the electrical connector 140 may be removably coupled to/from the circuit board 205 by, for example, the end user. In some embodiments according to the invention, the electrical connector 140 can be decoupled from the circuit board 205 when it is determined that the circuit 137 may have failed in the field thereby preventing operation of the solid state lighting apparatus 100. Therefore, the electrical connector 140 can be decoupled from the circuit board 205 so that a Field Replaceable Unit (FRU) including the replacement electrical connector and replacement circuit can then be coupled to the electrical connector 140 to restore operation of the solid state lighting apparatus 100.

Although FIG. 2 shows the circuit board 205 placed within the recess 130 so that the electrical components included in the circuit 137 face the opening of the recess 130, other orientations may be utilized. For example, in some embodiments according to the invention, the circuit board 205 may be a flexible printed circuit board having the electrical components of the circuit 137 mounted thereon. The flexible circuit board can be "rolled-up" to take the form of a tube which slides into the recess 130 so that the electrical components on the board 205 face a central axis of the electrical connector 105. In other embodiments according to the invention, the electrical components included in the circuit 137 can be mounted on both sides of the circuit board 205 so that electrical components face inward toward the central axis of the electrical connector 105 as well as away from the central axis of the electrical connector 105. In still other embodiments, the electrical components included in the circuit 137 can be mounted on a surface of the electrical connector 105 itself.

Figure 3:
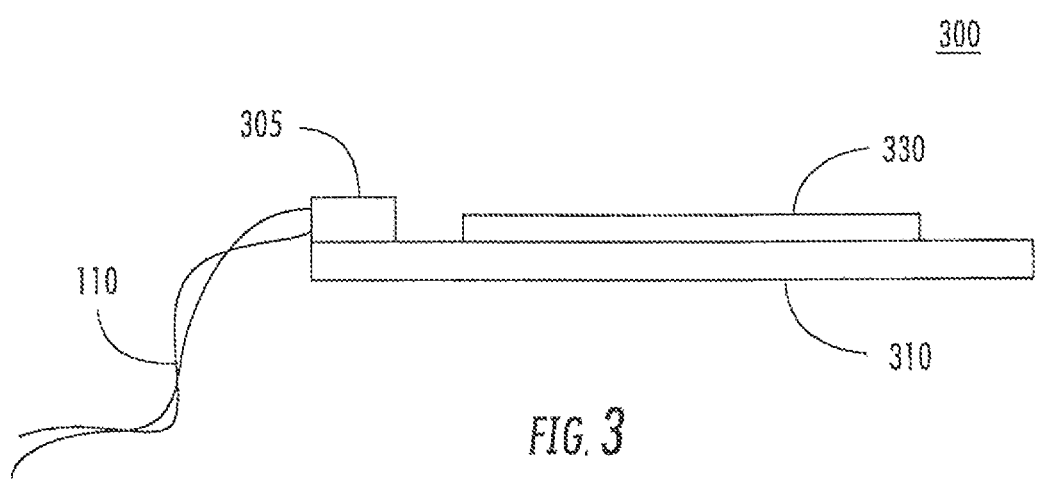
FIG. 3 is a cross-sectional view of remaining stages of the solid state driver circuit that is releasably coupled to the circuit of FIG. 2 by an electrical wire in some embodiments according to the invention.

FIG. 3 is a cross-sectional view of remaining stages 330 of the driver circuit that are not included in the circuit 137 on the circuit board 205 as an assembly 300 in some embodiments according to the invention. It will be understood that the assembly 300 is located outside the recess 130.

According to FIG. 3, the electrical wire 110 is electrically coupled to an electrical connector 305 which may be removably coupled to/from a circuit board 310 having the remaining stages 330 mounted thereon. It will be understood that the remaining stages 330 can be configured to operate in response to the voltage that may be provided to the remaining stages 330 via the electrical wire 110 coupled thereto by the electrical connector 305. It will be understood therefore, that the remaining stages 330 can include electrical components that are laid out on a particular specification of a Regulatory Agency for which compliance is sought. In some embodiments according to the invention, the remaining stages 330 includes only the boost circuit stage, so that no electrical components that operate in response to ac voltage (such as those that are included in the protective circuit stage and the EMI filter and rectifier circuit stage) are included on the circuit board 310.

Therefore, in some embodiments according to the invention, the layout of the remaining stages 330 can be more efficient than if ac electrical components included in the circuit 137 were to be included on the circuit board 310. Therefore, in some embodiments according to the invention, the size of the circuit board 310 may be reduced relative to what otherwise would be needed if at least some of the components included in the circuit 137 were included on the circuit board 310. It will be understood that although the cross-sectional view of FIG. 3 shows electrical components included in the remaining stages 330 mounted on a single side of the board 310, in other embodiments according to the invention, the electrical components may be located on both sides of the board 310.

It will be further understood that in embodiments where all of the stages of the driver circuit are included in the circuit 137 (i.e., in the recess 130), the assembly 300 may not include any remaining stages of the driver circuit. In such embodiments according to the invention, the entire assembly 300 may be eliminated from the apparatus 100.

Figure 4:
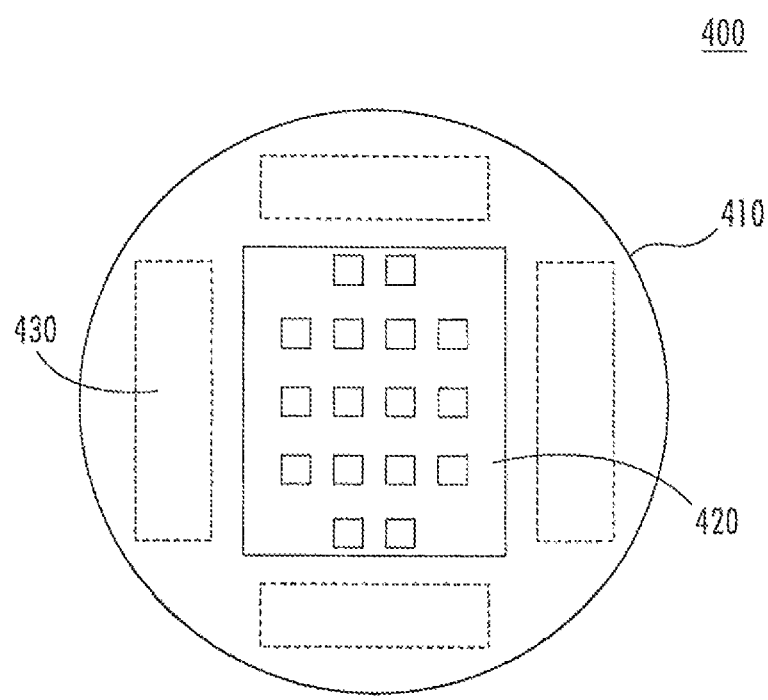
FIG. 4 is a plan view of at least a portion of the solid state lighting driver circuit and a light emitting device array integrated onto a circuit board in some embodiments according to the invention.

FIG. 4 is a plan view of a solid state lighting driver circuit/LED array assembly 400 in some embodiments according to the invention. As shown in FIG. 4, an array of light emitting devices (LEDs) 420 can be located in a central portion of a circuit board 410, whereas regions 430 located outside the LED array 420 can be utilized for electrical components in the remaining stages 330 of the solid state lighting driver circuit. In particular, if the remaining stages 330 and the LED array 420 are integrated together onto the circuit board 410, a separate circuit board (such as the circuit board 310) may be eliminated from the solid state lighting apparatus 100. Therefore, the solid state lighting driver circuit/LED array assembly 400 may be located within the solid state lighting apparatus housing 115, which may have a reduced size due to the elimination of the circuit board 310 otherwise allocated solely to the remaining stages 330 of solid state lighting driver circuit. In some embodiments according to the invention, the solid state lighting driver circuit/LED array assembly 400 can be located in the housing just upstream from the diffuser 116 in a portion 117 of the housing. In some embodiments according to the invention, the portion 115 of the housing can be eliminated.

The LEDs in the array 420 can be "chip-on-board" (COB) LEDs, coupled in series with one another, which are mounted on the board 410. Accordingly, the chip-on-board LEDs can be mounted on the board 410 without additional packaging which otherwise would be included if those LEDs were to be used in other applications where, for example, the LED is provided on a sub-mount, an intervening substrate, or other chip carrier to which the LED is mounted etc. Such other approaches are described, for example, in commonly assigned pending U.S. application Ser. No. 13/192,755, where for example, LEDs can be located on a submount, located on a lower substrate to provide a stacked arrangement, the disclosure of which is incorporated herein by reference. It will also be understood that the LEDs in the array can be packaged LED devices in the place of the COB LEDs, in some embodiments according to the invention. For example, in some embodiments according to the invention, the LED string circuit 110 can include XML-HV LEDs or XTE-HV LEDs available from Cree, Inc. of Durham N.C.

It will be understood that the term "mounted on" as used herein can includes configurations where the component (such as a chip-on-board LED) is physically connected to the board 410 without the use of intervening submounts, substrates, carriers, or other surfaces such as those described in the above-referenced commonly assigned U.S. application Ser. No. 13/192,755. Components that are described as being "mounted on" a substrate can be on the same surface of a substrate, or on opposing surfaces of the same substrate. For example, components that are placed and soldered on the same substrate during assembly can be described as being "mounted on" that substrate.

The board 410 can be made of materials such a polyimides and polyesters. The board 410 can be a flexible printed circuit board, which can allow the board to take a non-planar or curved shape, with the LED chips also being arranged in a non-planar manner. In some embodiments according to the invention, the board 410 can be a flexible printed board such as a Kapton® polyimide available from DuPont. In some embodiments according to the invention, the board 410 can be a standard FR-4 PCB The size of the board 410 can vary depending on different factors, such as the size and number of the LEDs mounted thereon. For example, in some embodiments the board 410 can be approximately 33 mm on each side. In some embodiments according to the invention, the components on the substrate can present a height of about 2.5 mm. Other dimensions can also be used for the board 410.

It will be understood that the board 410 can be utilized in combination with heat sink structures mounted to, or incorporated within, the board 410 to provide sufficient heat transfer away from the apparatus 100. In some embodiments according to the invention, a flexible heat transfer tape, such as GRAFIHX™, available from GraphTech, International of Lakewood, Ohio, can be used to attach a heat sink to the board 410. The heat sink can be any thermally efficient material sufficient to conduct heat away from the board 410. For example, the heat sink can be a metal, such as aluminum. In some embodiments according to the invention, the heat sink is graphite. In some embodiments according to the invention, the heat sink includes reflective surfaces to improve light extraction.

In some embodiments according to the invention, the LEDs in the array 420 can be arranged according to a particular pattern in approximately the center of the board 410. It will be understood, however, that the LEDs can be arranged in any way that is suitable to provide the light output desired from the solid state lighting apparatus 100. For example, the LEDs can be arranged in an approximately circular array, a rectangular array, a random array, or a semi-random array.

In some embodiments according to the invention, the LEDs are separated from the remainder of the electronic components mounted to the board 410 in the areas 430 by a reserved portion of the board 410, where the other electronic components are mounted on the substrate 100 only between outside the reserved portion. In some embodiments according to the invention, other electronic components are mounted in the reserved portion. In some embodiments according to the invention, COB LEDs can be mounted on the board 410 with the spacing between the LEDs being reduced, which may reduce the size of the solid state lighting apparatus 100 or the size allocated to the board 410 within the housing.

In some embodiments according to the present invention, LED array 420 can include LEDs that emit light of the same color or of different colors (e.g. red, green and blue LED chips or subgroups, white LED and red LED chips or subgroups, etc.) Techniques for generating white light from a plurality of discrete light sources to provide desired CRI at the desired color temperature have been developed that utilize different hues from different discrete light sources. Such techniques are described in U.S. Pat. No. 7,213,940, entitled "Lighting Device and Lighting Method", which is hereby incorporated herein by reference.

It will be understood that, in some embodiment where all of the stages of the driver circuit are located in the recess 130, the board 410 may include the LED array 420 and other related components but otherwise exclude the remaining stages 330 of the driver circuit. For example, in embodiments where the protective circuit stage and the EMI filter and rectifier circuit stage of the driver circuit are located on the circuit board 137 in the recess 130, the board 410 may include the boost circuit stage. In still other embodiments according to the invention where the boost circuit stage is included in the circuit 137 (along with the other stages), the board 410 may include only the LED array 420 and related components.

Figure 5:
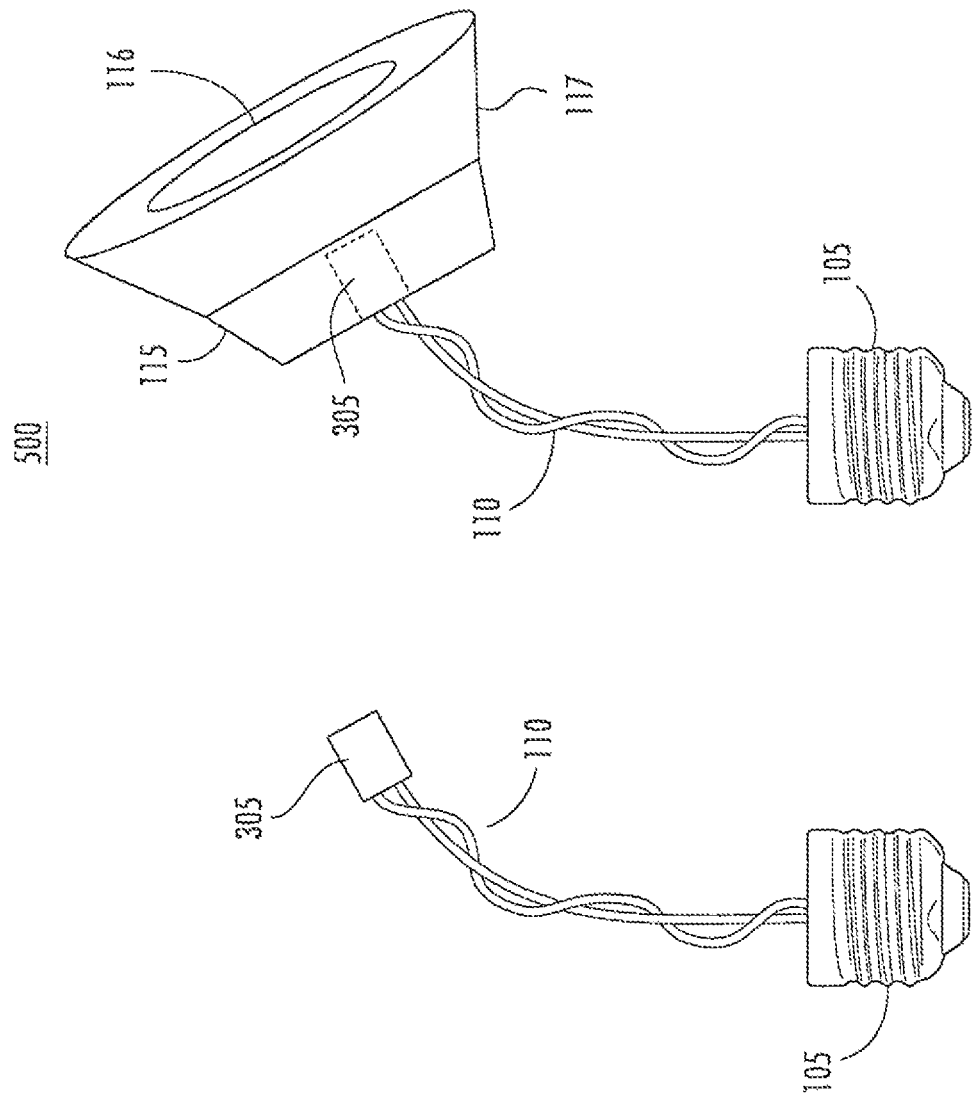
FIG. 5 is an illustration of a solid state lighting apparatus kit including the solid state lighting apparatus shown in FIG. 1 with a field replaceable electrical connector and electrical wire in some embodiments according to the invention.

FIG. 5 is a representation of a solid state lighting apparatus kit 500 in some embodiments according to the invention. It will be understood that the kit 500 can be sold to end users or installation personnel as a single unit. According to FIG. 5, a solid state lighting apparatus includes the electrical connector 105 coupled to the wire 110 which is also coupled to the solid state lighting housing 115. It will be understood that in some embodiments according to the invention, a replacement assembly including a replacement electrical connector 105 and a replacement electrical wire 110, coupled to the replacement electrical connector 305, can both be provided in the solid state lighting apparatus kit 500. It will be understood that if the solid state lighting apparatus 100 is determined to be inoperative, the electrical wire 110 can be decoupled from the solid state lighting apparatus housing 115, whereupon the replacement connector 305 can be coupled to the fixture housing 115 in its place. Therefore, if the circuit 137 has failed, it can be replaced by the field replaceable unit 105 which may repair the solid state lighting apparatus 100 at a lower cost than a repair of the entire apparatus 100.

In some embodiments according to the invention, the replacement electrical connector 305 can be located at the opposing end of the electrical wire 110 as part of the original fixture so that when the circuit 137 fails, the electrical wire 110 may be reused whereas the replacement electrical connector 105 (including the replacement circuit) may be used to replace the defective electrical connector 105. Therefore, in some embodiments according to the invention, the field replaceable kit 500 can include only the replacement electrical connector 105 with the circuit 137 included therein (i.e, in such embodiments, the electrical wire 110 shown connected to the replacement electrical connector 105 can be eliminated and instead, the original electrical wire may be reused).

It will be further understood that, in some embodiments according to the invention, the replacement electrical connector 105 (including the replacement circuit) may be available separate from the field replaceable kit 500.

Figure 7:
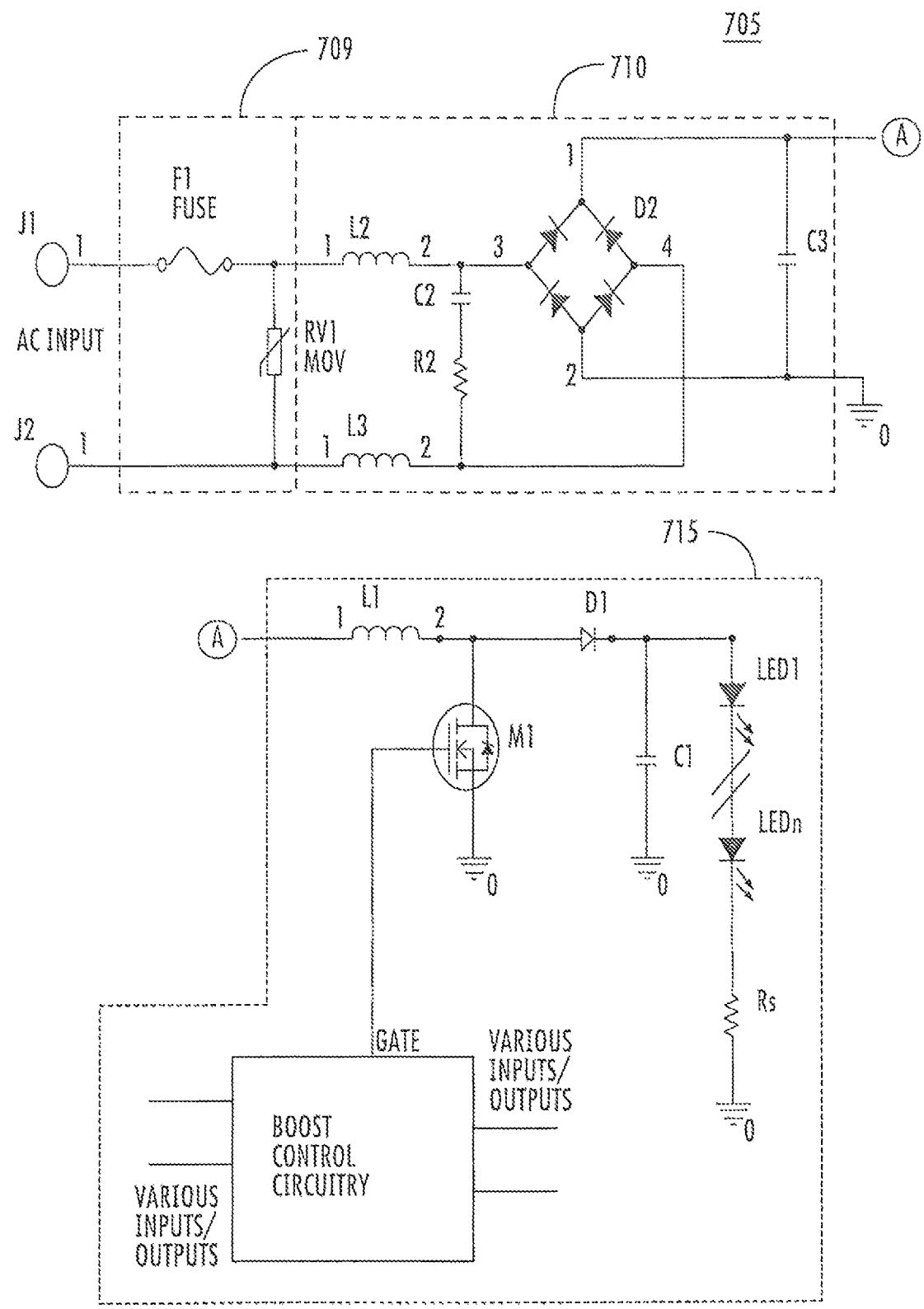
FIG. 7 is a circuit schematic illustrating a solid state driver circuit including a protective circuit stage, an EMI filter and rectifier circuit stage, and a boost circuit stage in some embodiments according to the invention.

FIG. 7 is a schematic diagram of a driver circuit 705 including a protective circuit stage 709 coupled to an EMI filter and rectifier circuit stage 710, coupled to a boost circuit stage 715 in some embodiments according to the invention.

It will be understood that, in some embodiments according to the invention, at least the protective circuit stage 709 can be included in the circuit 137, whereas the remaining stages are located outside the recess. In other embodiments, the EMI filter and rectifier circuit stage 710 can also be included in the circuit 137, whereas the boost circuit stage is located outside the recess. In still other embodiments, the boost circuit stage is also included in the circuit along with the other stages.

According to FIG. 7, an ac voltage signal across terminals J1/J2 can be about 120 V ac at about 60 Hz. The ac voltage signal is input to the protective circuit stage 709 having a fuse F1 that protects the driver circuit from short circuits or excessive currents that may otherwise be drawn from the ac voltage signal. RV 1 is a metal oxide varistor (MOV) that is provided to clamp short duration voltage transients may occur on the line (such as when a lightning strike occurs) so that the remaining circuitry is not subjected to excessive voltages. In operation, when a long duration voltage transient occurs on the ac line, the RV1 MOV may fail due to the excessive energy dissipated in it. If the RV1 MOV fails, an internal short may occur resulting in excessive current being drawn from the ac line, which may cause the fuse F1 to open, which renders the apparatus 100 inoperable, although the remainder of the circuitry may be undamaged.

Therefore, in some embodiments according to the invention, the electrical connector 105 can be decoupled from the apparatus 100 so that a Field Replaceable Unit (FRU) including the replacement electrical connector and replacement circuit 137 (including a protective circuit stage including an undamaged fuse and MOV) can then be coupled to the electrical connector 140 to restore operation of the solid state lighting apparatus 100.

The output of the protective circuit stage 709 is coupled to the EMI filter and rectifier circuit stage 710, which can provide an output voltage of about 180 Volts dc so that the power level for the circuit 705 is about 10 W to about 20 W. It will be understood, however, that other voltage and power levels can be used. The EMI filter includes inductors L2, L3 and capacitor C3 along with an EMI filter damping circuit that includes the C2-R2 combination. It will be understood that other configurations of the EMI filter circuit and the EMI filter damping circuit may be used. Furthermore, in some embodiments according to the invention, components included in the EMI filter circuit and in the EMI filter damping circuit can be placed before, after, or on both sides of the rectifier D2.

Therefore, in some embodiments according to the invention where the circuit 137 includes the protective circuit stage 709 and the EMI filter and rectifier circuit stage 710, the electrical connector 105 can be decoupled from the apparatus 100 so that a Field Replaceable Unit (FRU) including the replacement electrical connector and replacement circuit 137 (with a replacement protective circuit stage and an EMI filer and rectifier circuit stage) can then be coupled to the electrical connector 140 to restore operation of the solid state lighting apparatus 100.

Still referring to the FIG. 7, the output of the EMI filter and rectifier circuit stage 710 is coupled to the boost circuit stage 715, which includes a boost inductor L1, a switch M1, a boost diode D1, and a storage capacitor C1. Boost control circuitry receives various feedforward and feedback inputs and provides a pulse-width-modulated (PWM) switching signal to the gate terminal of the switch M1 so that the switch M1 can be turned on/off. The switching frequency of the switch M1 may be between about 20 kHz to about 1

MHz or more. In some embodiments according to the invention, the switching frequency of the switch M1 may be about 100 kHz.

It will be understood that the switching of the switch M1 can generate a current ripple in inductor L1 which may need to be filtered in order to satisfy EMI requirements. In particular, when the switch M1 is turned on, the current in the inductor L1 ramps up. When the switch M1 is turned off the energy stored in the inductor L1 is delivered to the output capacitor C1 through diode D1. With power factor correction, the average input current may be shaped close to a sinusoid. The output capacitor can filter the switching frequency ripple and can store energy so that the current provided to the LEDs 1-N can be substantially dc. It will be understood that although the term "boost circuit" is used herein, the circuit stage 715 may also be described using other terminology, such as a buck circuit, a flyback circuit, or SEPIC circuit.

Therefore, in some embodiments according to the invention where the circuit 137 includes the protective circuit stage 709, the EMI filter and rectifier circuit stage 710, and the boost circuit stage 715, the electrical connector 105 can be decoupled from the apparatus 100 so that a Field Replaceable Unit (FRU) including the replacement electrical connector and replacement circuit 137 can then be coupled to the electrical connector 140 to restore operation of the solid state lighting apparatus 100.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

It will be understood that, as used herein, the term light emitting diode may include a light emitting diode, laser diode and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive layers.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

What is claimed:
1. An apparatus comprising:
  a first electrical connector configured to releasably couple to a standardized electrical fixture;
  a contact electrically coupled to the first electrical connector for receiving an AC voltage;
  a second electrical connector coupled to the contact;
  a protective circuit coupled between the contact and the second electrical connector;
  a Light Emitting Device (LED) array housing positioned outside the first electrical connector;
  an LED array positioned within the LED array housing; and
  a flexible wire coupled to the second electrical connector and to the LED array,
  wherein the LED array housing is separated from the first electrical connector and the protective circuit and is configured to be releasably connected to the first electrical connector.

2. The apparatus of claim 1, wherein tire second electrical connector is within a recess of the first electrical connector.

3. The apparatus of claim 1, wherein the standardized electrical fixture comprises an Edison style electrical lighting fixture or a bayonet style electrical lighting fixture.

4. The apparatus of claim 1, wherein the flexible wire is configured to be releasably connected to the second electrical connector.

5. The apparatus of claim 1, wherein the flexible wire is configured to be releasably connected to the LED array housing.

6. The apparatus of claim 1, further comprising a rectifier circuit in the LED array housing that is separated from the first electrical connector and the protective circuit.

\* \* \* \* \*

UNITED STATES PATENT AND TRADEMARK OFFICE
CERTIFICATE OF CORRECTION

PATENT NO. : 10,531,535 B2
APPLICATION NO. : 15/660168
DATED : January 7, 2020
INVENTOR(S) : Praneet Jayant Athalye It is certified that error appears in the above-identified patent and that said Letters Patent is hereby corrected as shown below:

On the Title Page

Item (56) References Cited, OTHER PUBLICATIONS, Column 2, International Preliminary Report cite: Please correct "dated Nov. 18," to read -- dated Nov. 13, --

In the Specification

Column 1, Line 10: Please correct "May 19, 2014" to read -- May 16, 2014 --

Column 1, Line 37: Please correct "de" to read -- dc --

Column 10, Line 16: Please correct "RV 1" to read -- RV1 --

Signed and Sealed this
Thirty-first Day of March, 2020

Andrei Iancu
*Director of the United States Patent and Trademark Office*